US009259812B1

(12) United States Patent  
Blanton

(10) Patent No.: US 9,259,812 B1
(45) Date of Patent: Feb. 16, 2016

(54) CLAMP ASSEMBLY AND METHOD

(71) Applicant: The Boeing Company, Seal Beach, CA (US)

(72) Inventor: Ross Mitchell Blanton, Hazelwood, MO (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 13/927,525

(22) Filed: Jun. 26, 2013

(51) Int. Cl.
*F16C 17/00* (2006.01)
*B23P 19/04* (2006.01)

(52) U.S. Cl.
CPC ...................................... *B23P 19/04* (2013.01)

(58) Field of Classification Search
CPC ...... F16C 17/022; F16C 33/046; F16C 43/02; F16C 2226/74
See application file for complete search history.

(56) References Cited

U.S. PATENT DOCUMENTS

| | | | | |
|---|---|---|---|---|
| 1,781,157 A | * | 11/1930 | Calkins | A01B 39/18 172/44 |
| 2,026,313 A | * | 12/1935 | Huffman | E21B 19/24 24/498 |
| 3,441,323 A | * | 4/1969 | Huffman | E21B 19/24 269/32 |
| 4,083,580 A | * | 4/1978 | Shaner | B60G 21/0551 267/276 |
| 4,412,753 A | * | 11/1983 | Linn | F16C 35/02 384/434 |
| 5,079,798 A | * | 1/1992 | Burke | E05D 5/0246 16/252 |
| 5,127,746 A | * | 7/1992 | Rogge | B41F 13/20 384/24 |
| 5,520,465 A | * | 5/1996 | Kammel | B60G 21/0551 267/293 |
| 6,777,636 B2 | * | 8/2004 | Ahlert | F16C 33/08 200/244 |
| 8,333,514 B2 | * | 12/2012 | Weimer | G02B 23/16 384/434 |
| 2007/0201780 A1 | * | 8/2007 | Connell | A01B 63/16 384/275 |
| 2008/0047319 A1 | * | 2/2008 | Thibault | B25B 27/10 72/416 |
| 2010/0170371 A1 | * | 7/2010 | Piguet | B24B 3/247 82/121 |

* cited by examiner

*Primary Examiner* — Thomas R. Hannon
(74) *Attorney, Agent, or Firm* — Armstrong Teasdale LLP

(57) ABSTRACT

In one aspect, a bushing for use in a pin assembly that includes a swinging housing and a stationary housing is provided. The bushing includes a first end portion, a second end portion, and a central portion extending between the first and second end portions and including a plurality of flexible fingers, each of said flexible fingers includes a retention feature configured to engage one of the swinging housing and the stationary housing in a snap-fit configuration.

20 Claims, 8 Drawing Sheets

CLAMP ASSEMBLY AND METHOD

BACKGROUND

The field of the disclosure relates generally to a pin clamp assembly, and more specifically, to snap-fit bushings for use in a pin clamp assembly.

Clamp assemblies, such as clamshell clamps, are used to mount and/or secure one or more components. For example, clamp assemblies may be utilized to mount engines in an aircraft. In at least some known clamp assemblies, a component is oriented between a sliding pin that has limited freedom of movement in an axial direction and a stationary pin.

In at least some known clamp assemblies, the stationary pin and sliding pin are each inserted into a respective clamp. Bushings are typically positioned between the pin and clamp to provide a wear surface and to prevent damage to the pin and/or clamp. In at least some known clamp assemblies, specialized tools and/or parts are required to install, to retain, and/or to remove the bushings from the clamps. For example, at least some known clamp assemblies utilize pins and springs to retain the bushings in the clamps. However, such specialized tools and parts may be relatively expensive, and it may be relatively time-consuming and difficult to install and/or to remove bushings using such tools. Further parts used for retaining the bushings in the clamps may consume space, increasing the footprint of the clamp assembly.

Further, in at least some known clamp assemblies, the dimensions of known components may vary due to thermal expansion, machining tolerances, and/or forces acting on the components (e.g., differential air pressures and internal forces due to acceleration). If these variations are not accounted for in the design of the clamp assembly, such variations may damage and/or render inoperable at least some known clamp assemblies.

BRIEF DESCRIPTION

In one aspect, a bushing for use in a pin assembly that includes a swinging housing and a stationary housing is provided. The bushing includes a first end portion, a second end portion, and a central portion extending between the first and second end portions and including a plurality of flexible fingers, each of said flexible fingers includes a retention feature configured to engage one of the swinging housing and the stationary housing in a snap-fit configuration.

In another aspect, a pin assembly is provided. The pin assembly includes a stationary housing defining a first recess, a swinging housing rotatably coupled to the stationary housing and defining a second recess, a first bushing positioned within the first recess and coupled to the stationary housing in a snap-fit engagement, and a second bushing positioned within the second recess and coupled to the swinging housing in a snap-fit engagement.

In yet another aspect, a method for assembling a pin clamp is provided. The method includes rotatably coupling a stationary housing to a swinging housing, wherein the stationary housing defines a first recess and the swinging housing defines a second recess, coupling a first bushing to the stationary housing in a snap-fit engagement such that the first bushing is positioned within the first recess, and coupling a second bushing to the swinging housing in a snap-fit engagement such that the second bushing is positioned within the second recess.

The features, functions, and advantages that have been discussed can be achieved independently in various implementations or may be combined in yet other implementations, further details of which can be seen with reference to the following description and drawings.

DETAILED DESCRIPTION

The systems and methods described herein enable installing and removing bushings from a clamp assembly relatively quickly and easily, and without the use of specialized tools. The bushings include a retention feature that allows for a snap-fit engagement between the bushings and a housing. The bushings also include a chamfer that facilitates removing the bushings using common tools, such as a flat-head screwdriver.

Figure 1:
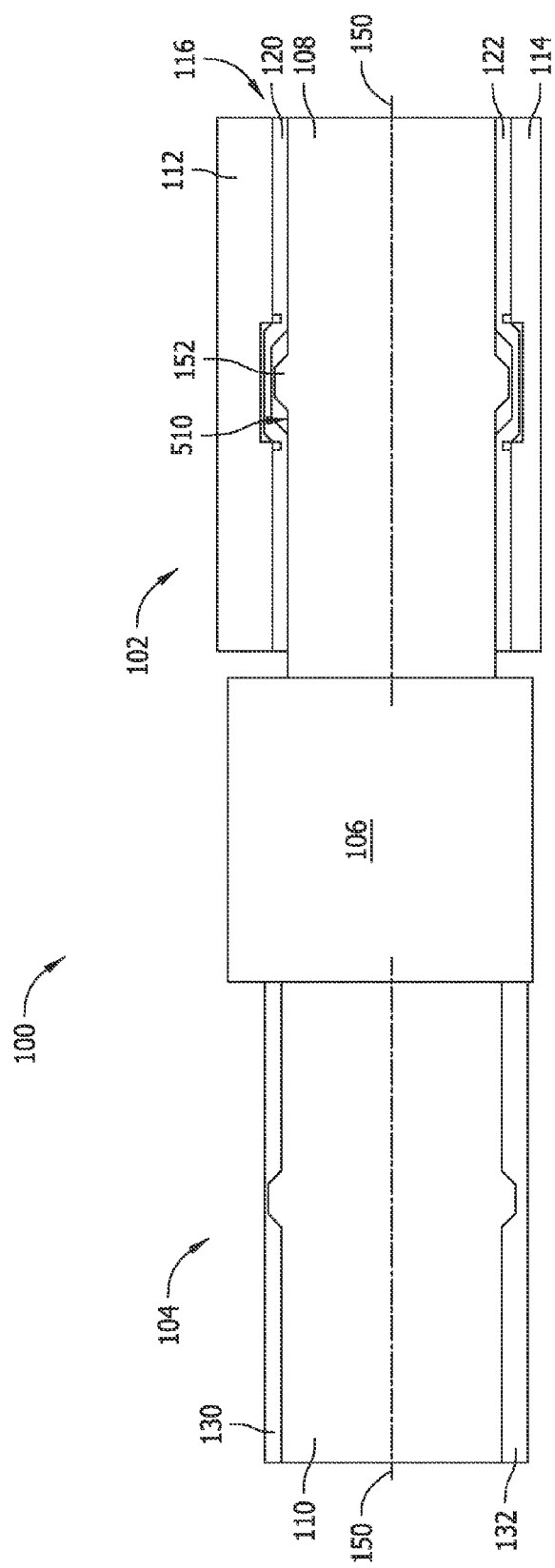
FIG. 1 is a schematic diagram of an exemplary clamp assembly.

FIG. 1 is a schematic diagram of an exemplary clamp assembly 100 that includes a first pin assembly 102 and a second pin assembly 104. Clamp assembly 100 may be referred to as a clamshell clamp assembly, first pin assembly 102 may be referred to as a sliding pin assembly, and second pin assembly 104 may be referred to as a fixed pin assembly. A component 106 is clamped between first and second pin assemblies 102 and 104. More specifically, component 106 is clamped between a first pin 108 of first pin assembly 102 and a second pin 110 of second pin assembly 104. Component 106 may be any manufacturing and/or assembly element that can be clamped between first and second pin assemblies 102 and 104. For example, component 106 may be an aircraft engine component.

First pin assembly 102 includes a first swinging housing 112 that is rotatably coupled to a first stationary housing 114. A bushing assembly 116 secures first pin 108 between first swinging housing 112 and first stationary housing 114. More specifically, bushing assembly 116 includes a first bushing 120 that fits into first swinging housing 112 and a second bushing 122 that fits into first stationary housing 114, as described in detail herein. Bushing assembly 116 facilitates protecting first swinging housing 112 and first stationary housing 114 from wear and/or damage.

Similar to first pin assembly 102, second pin assembly 104 includes a second swinging housing 130 rotatably coupled to a second stationary housing 132. Unlike first pin assembly 102, in the exemplary implementation, second pin assembly 104 does not include bushing assembly 116. Instead, second pin 110 contacts second swinging housing 130 and second stationary housing 132 directly.

Figure 2:
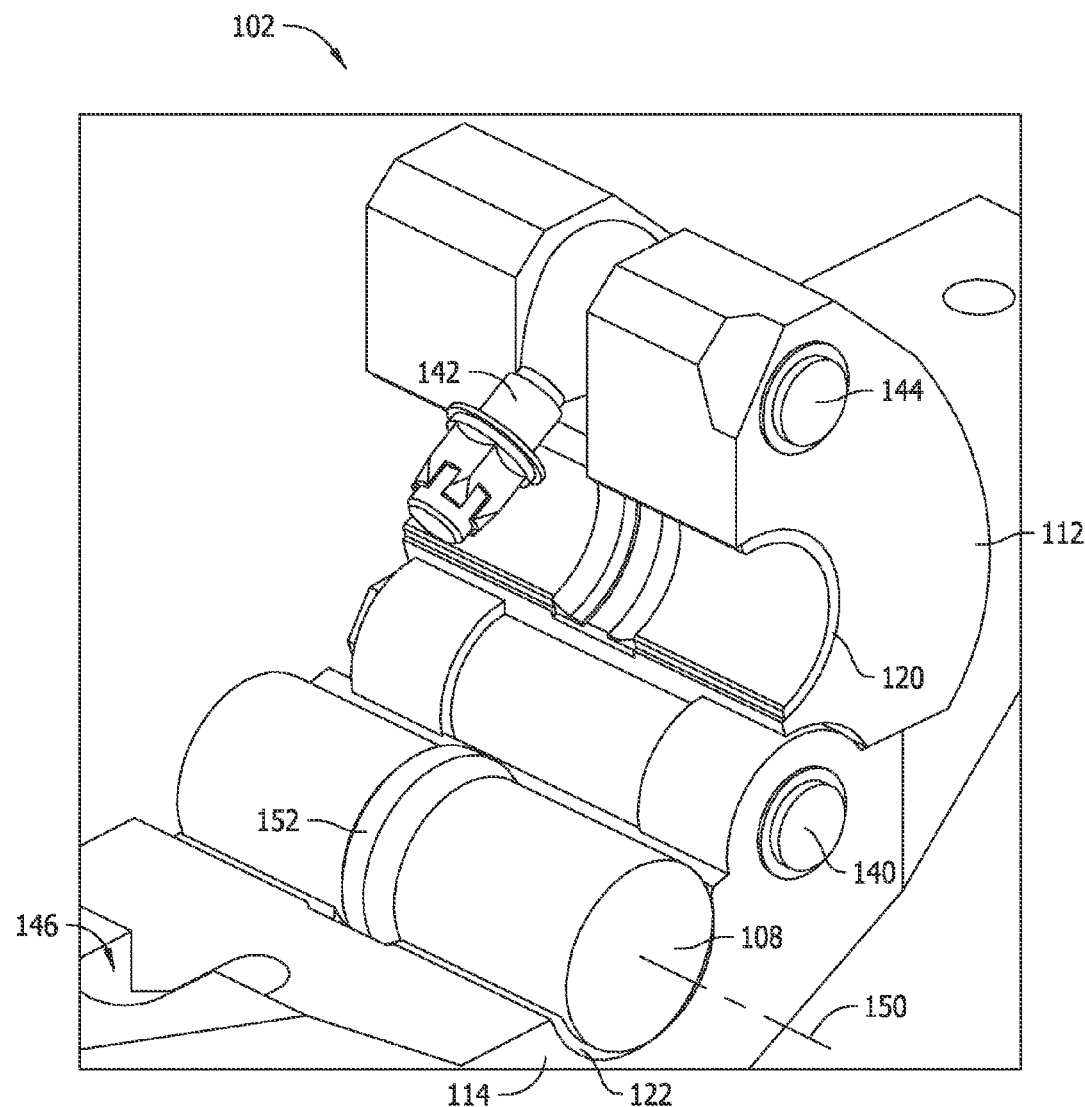
FIG. 2 is a perspective view of a portion of an exemplary pin assembly that may be used with the clamp assembly shown in FIG. 1.
Figure 3:
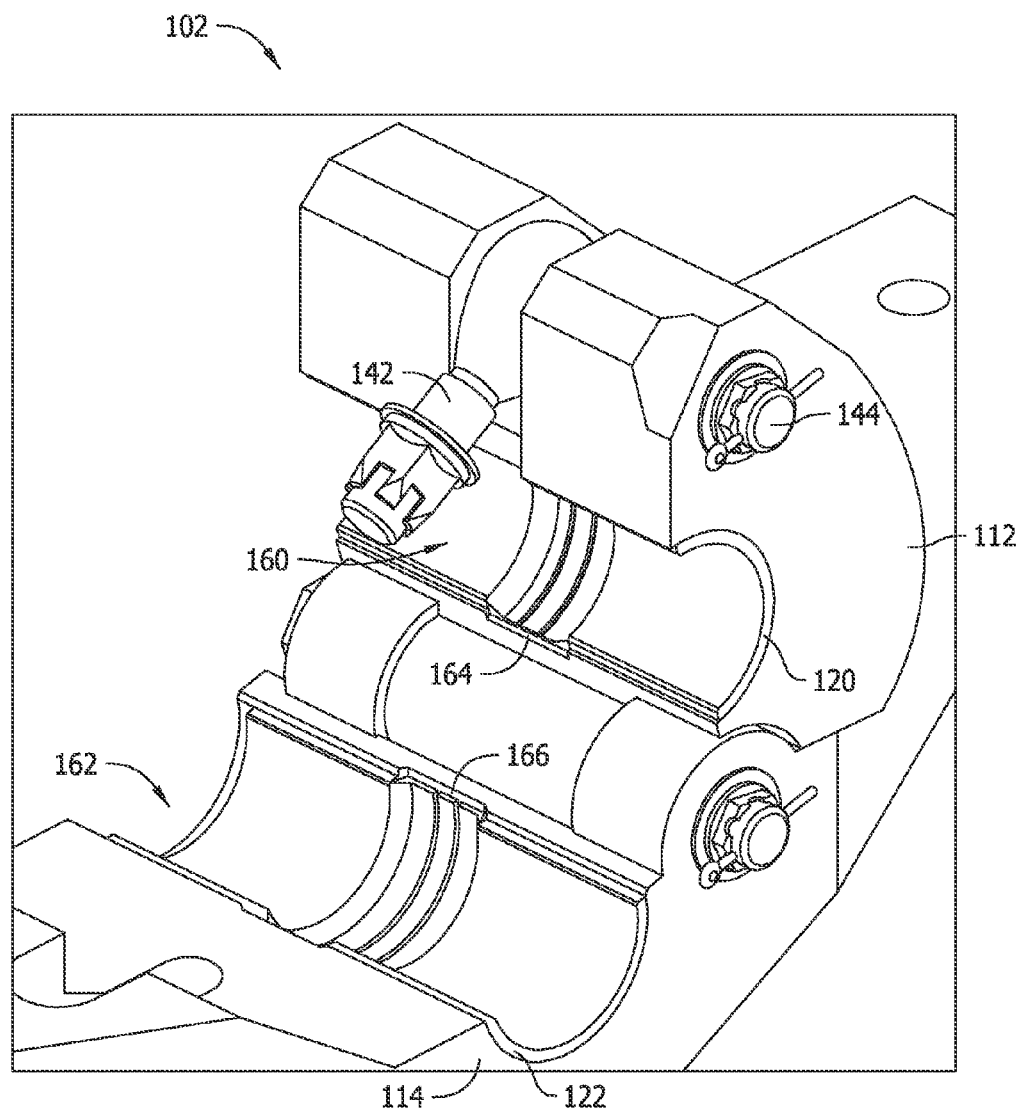
FIG. 3 is a perspective view of a portion of the pin assembly shown in FIG. 2.
Figure 4:
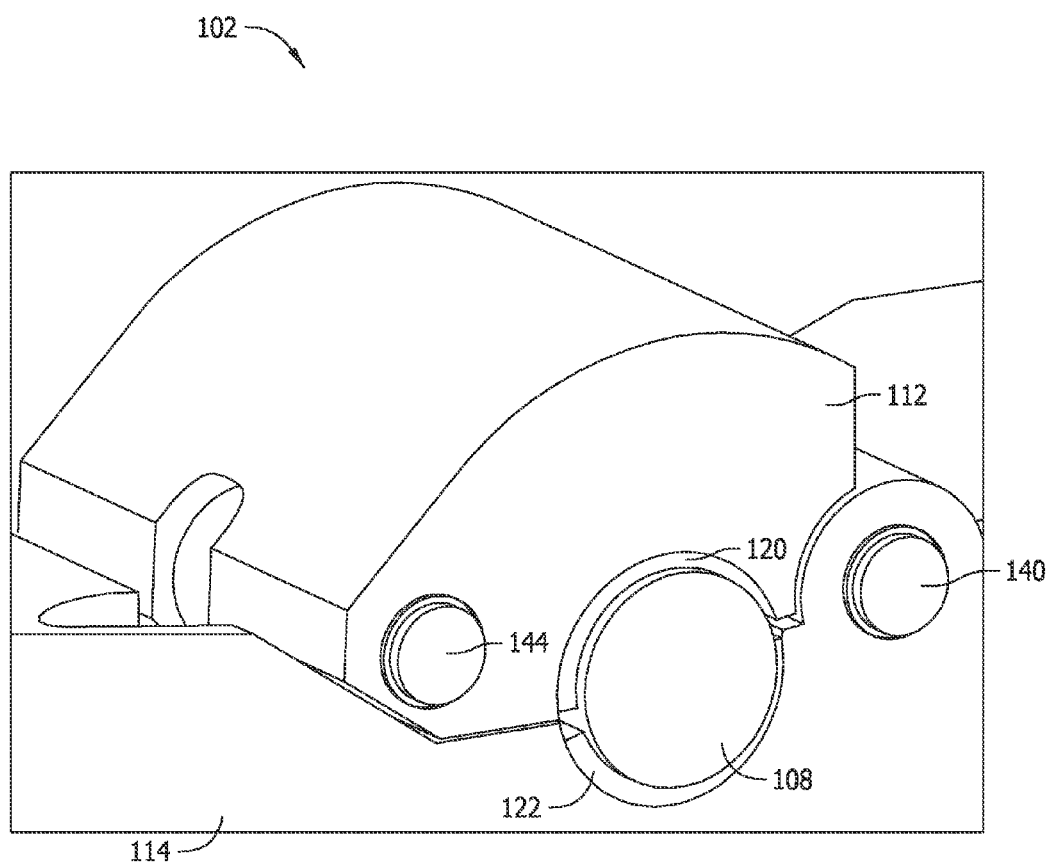
FIG. 4 is a perspective view of a portion of the pin assembly shown in FIG. 2.

FIG. 2 is a perspective view of a portion of first pin assembly 102 in an open position (i.e., with first swinging housing 112 rotated away from first stationary housing 114). FIG. 3 is a perspective view of a portion of first pin assembly 102 in an open position with first pin 108 omitted. FIG. 4 is a perspective view of a portion of first pin assembly 102 in a closed position.

As shown in FIGS. 2-4, first swinging housing 112 is rotatably coupled to first stationary housing 114 about a first shaft 140. A stud 142 extends from a second shaft 144 that is coupled to first swinging housing 112. Stud 142 is received in a corresponding aperture 146 to facilitate maintaining first pin assembly 102 in a closed the position.

As shown in FIG. 2, first pin 108 is generally cylindrical, and extends along a longitudinal axis 150. First pin 108 includes a circumferential lip 152 at a midpoint of first pin 108. Circumferential lip 152 is received by first and second bushings 120 and 122, as described in detail herein. Second pin 110 is substantially identical to first pin 108.

In the exemplary implementation, first swinging housing 112 defines a first semi-circular recess 160 that receives first bushing 120, and first stationary housing 114 includes a second semi-circular recess 162 that receives second bushing 122. First semi-circular recess 160 includes a first groove 164, and second semi-circular recess 162 includes a second groove 166. In the exemplary implementation, first and second bushings 120 and 122 couple to first swinging housing 112 and first stationary housing 114 in a snap-fit engagement, as described in detail herein. Alternatively, first and second bushings 120 and 122 may couple to first swinging housing 112 and first stationary housing 114 using any mechanism that enables first pin assembly 102 to function as described herein. For example, in one embodiment, first and second bushings 120 and 122 include a magnetic material that is attracted to magnetic materials in first swinging housing 112 and first stationary housing 114. In this embodiment, secondary feature, such as a pin in a slot, may be used to position first and second bushings 120 and 122 within first swinging housing 112 and first stationary housing 114.

Figure 5:
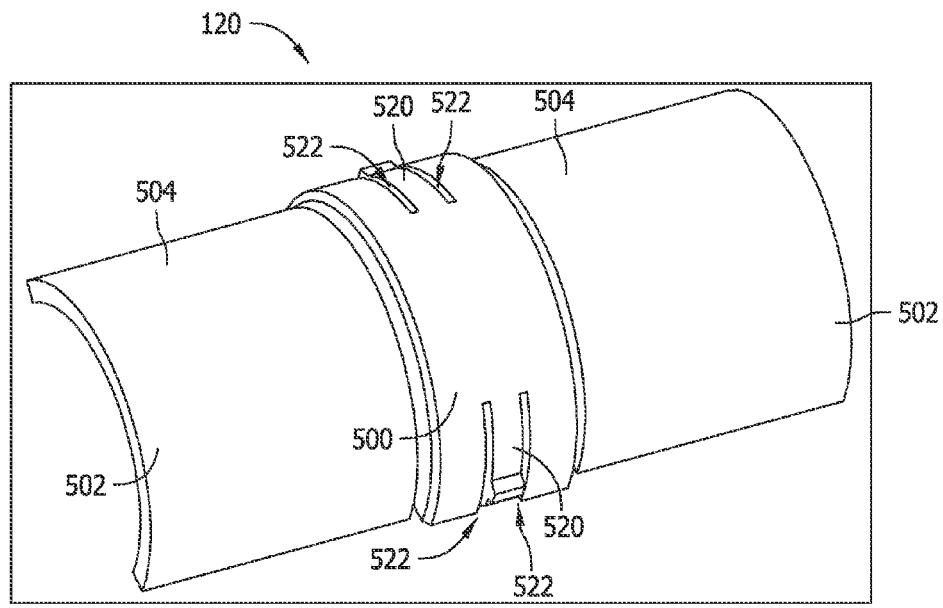
FIG. 5 is a perspective view of an exemplary bushing that may be used with the clamp assembly shown in FIG. 1.
Figure 6:
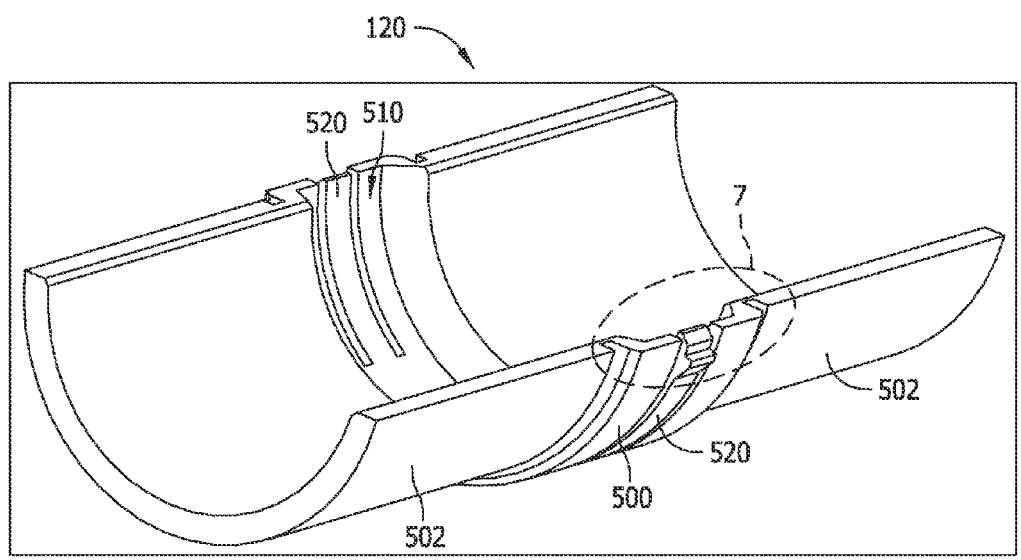
FIG. 6 is a perspective view of the bushing shown in FIG. 5.
Figure 7:
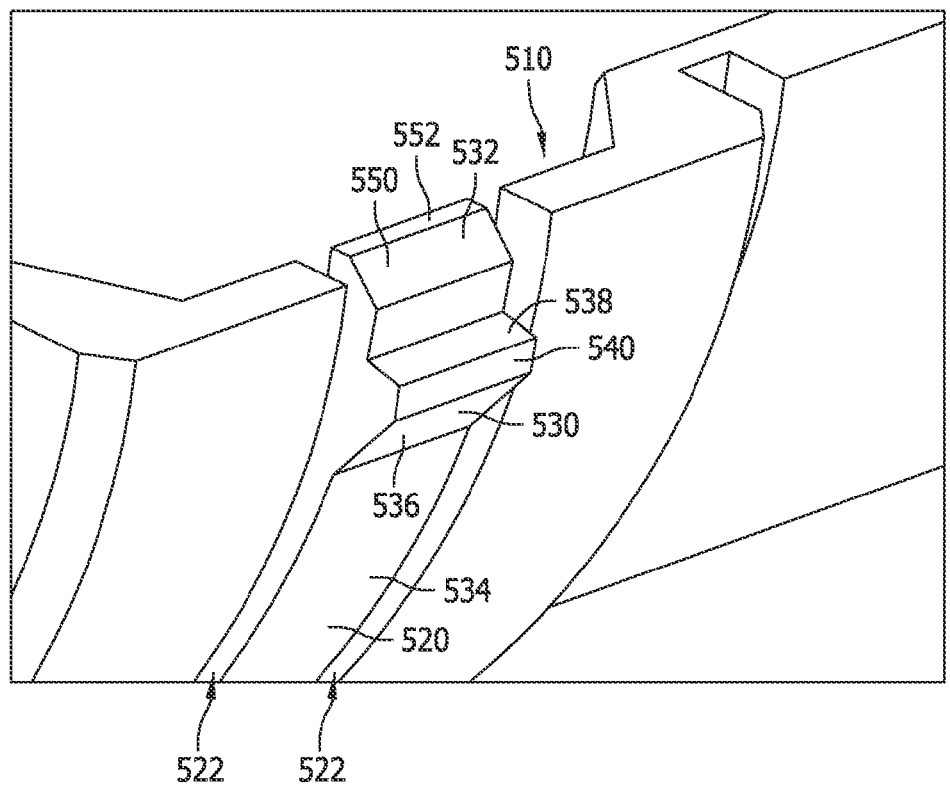
FIG. 7 is a perspective view of a portion of the bushing shown in FIG. 6 and taken along area 7.

FIGS. 5 and 6 are perspective views of first bushing 120. FIG. 7 is a perspective view of a portion of first bushing 120 taken along area 7 (shown in FIG. 6). In the exemplary implementation, first bushing 120 is substantially identical to second bushing 122. First and second bushings 120 and 122 are copper-based alloys (e.g., beryllium copper, aluminum bronze, etc.) in the exemplary implementation. Alternatively, first and second bushings 120 and 122 may be fabricated using any material (e.g., plastic, steel, etc.) that enables first and second bushings 120 and 122 to function as described herein.

As shown in FIGS. 5 and 6, first bushing 120 includes a central portion 500 and two end portions 502 that extend from central portion 500. Each end portion 502 includes an arcuate surface 504 such that first bushing has a generally semi-circular cross-section that is complementary to first and second semi-circular recesses 160 and 162 formed in first swinging housing 112 and first stationary housing 114, respectively. In the exemplary implementation, central portion 500 is offset with respect to end portions 502. Accordingly, when first bushing 120 is fit into first semi-circular recess 160 or second semi-circular recess 162, central portion 500 fits into associated first groove 164 or second groove 166.

In the exemplary implementation, an interior channel 510 is defined in central portion 500. Referring back to FIGS. 1 and 2, interior channel 510 receives circumferential lip 152 of first pin 108. Further, as shown in FIG. 1, interior channel 510 is longer than circumferential lip 152 in an axial direction (i.e., along longitudinal axis 150). Accordingly, with first pin assembly 102 in a closed position, first pin 108 still has limited freedom to slide along the axial direction. This allows for variations due to manufacturing tolerances for first pin 108, forces acting on first pin 108 (e.g., differential air pressures and internal forces due to acceleration), and/or thermal expansion of first pin 108. In the exemplary implementation, second pin 110 is constrained by second swinging housing 130 and second stationary housing 132, and cannot translate in the axial direction. First and second pins 108 and 110 are both free to rotate about longitudinal axis 150, even with first and second pin assemblies 102 and 104 in the closed position.

Central portion 500 includes two fingers 520 that facilitate engaging first swinging housing 112 or first stationary housing 114, as described in detail herein. Each finger 520 is defined by a pair of parallel slots 522 that extend partway through central portion 500. Because of parallel slots 522, each finger 520 is flexible with respect to the rest of central portion 500.

As shown in FIG. 7, each finger 520 includes a retention feature 530 and a chamfer 532. Retention feature 530 extends from a top surface 534 of finger 520. More specifically, in the exemplary implementation, retention feature 530 includes a tapered side wall 536 that is oriented obliquely relative to top surface 534, a vertical side wall 538 that is orthogonal to top surface 534, and a top wall 540 that extends between tapered side wall 536 and vertical side wall 538. Top wall 540 is oriented substantially parallel to top surface 534. Alternatively, retention feature 530 may have any configuration that enables first bushing 120 to couple to first swinging housing 112 or first stationary housing 114 in a snap-fit engagement. Chamfer 532 includes an angled wall 550 that extends between top surface 534 and an end surface 552 of finger 520.

Figure 8:
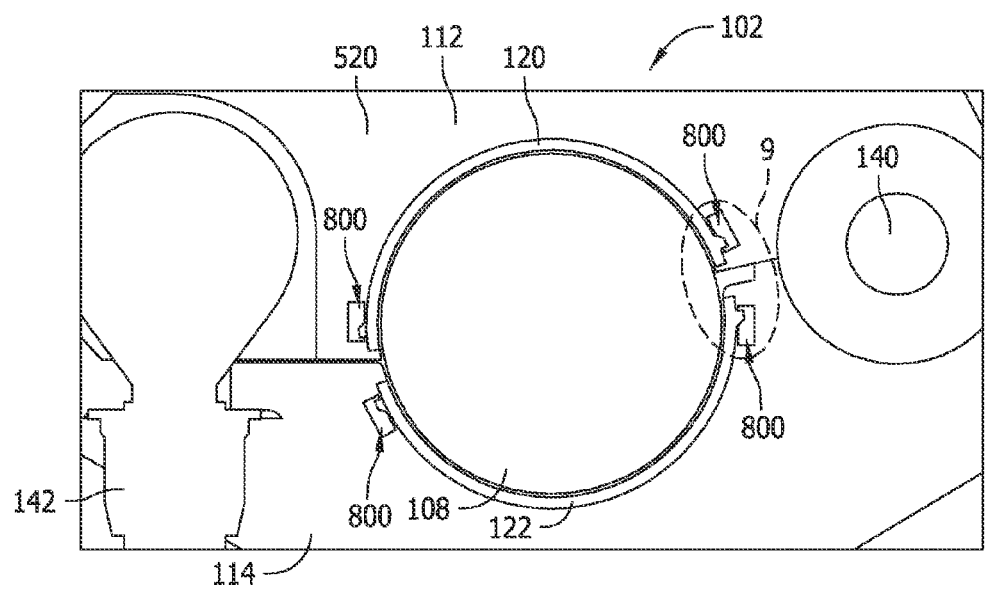
FIG. 8 is a cross-sectional view of a portion of the pin assembly shown in FIG. 2.
Figure 9:
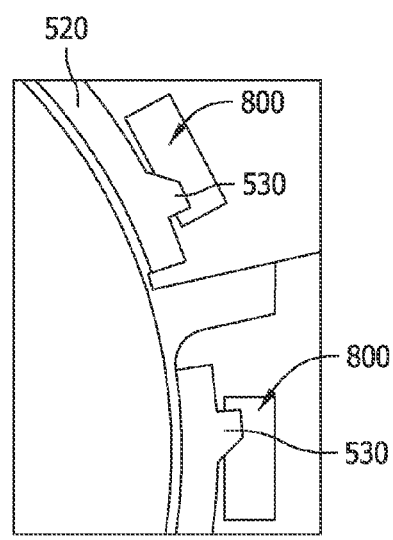
FIG. 9 is a cross-sectional view of a portion of the pin assembly shown in FIG. 8 and taken along area 9.

FIG. 8 is a cross-sectional view of a portion of first pin assembly 102. FIG. 9 is a cross-sectional view of a portion of first pin assembly 102 taken along area 9 (shown in FIG. 8). As shown in FIG. 8, first swinging housing 112 and first stationary housing 114 each include two retention hollows 800 that receive retention features 530. More specifically, when first bushing 120 is inserted into first swinging housing 112 or first stationary housing 114, fingers 520 initially flex inward (i.e., towards longitudinal axis 150). Once retention features 530 reach corresponding retention hollows 800, fingers 520 flex outward such that retention features 530 engage retention hollows 800. As such, first bushing 120 couples to first swinging housing 112 or first stationary housing 114 in a snap-fit engagement, or snap-fit configuration.

Chamfers 532 facilitate removing first bushing 120 from first swinging housing 112 or first stationary housing 114. Specifically, by applying leverage to chamfer 532 using a suitable tool (e.g., a flat head screwdriver), finger 520 flexes inward, removing retention feature 530 from retention hollow 800. Accordingly, first bushing 120 can be installed and removed from first swinging housing 112 or first stationary housing 114 relatively quickly and easily, and without using specialized and/or relatively expensive tools.

Figure 10:
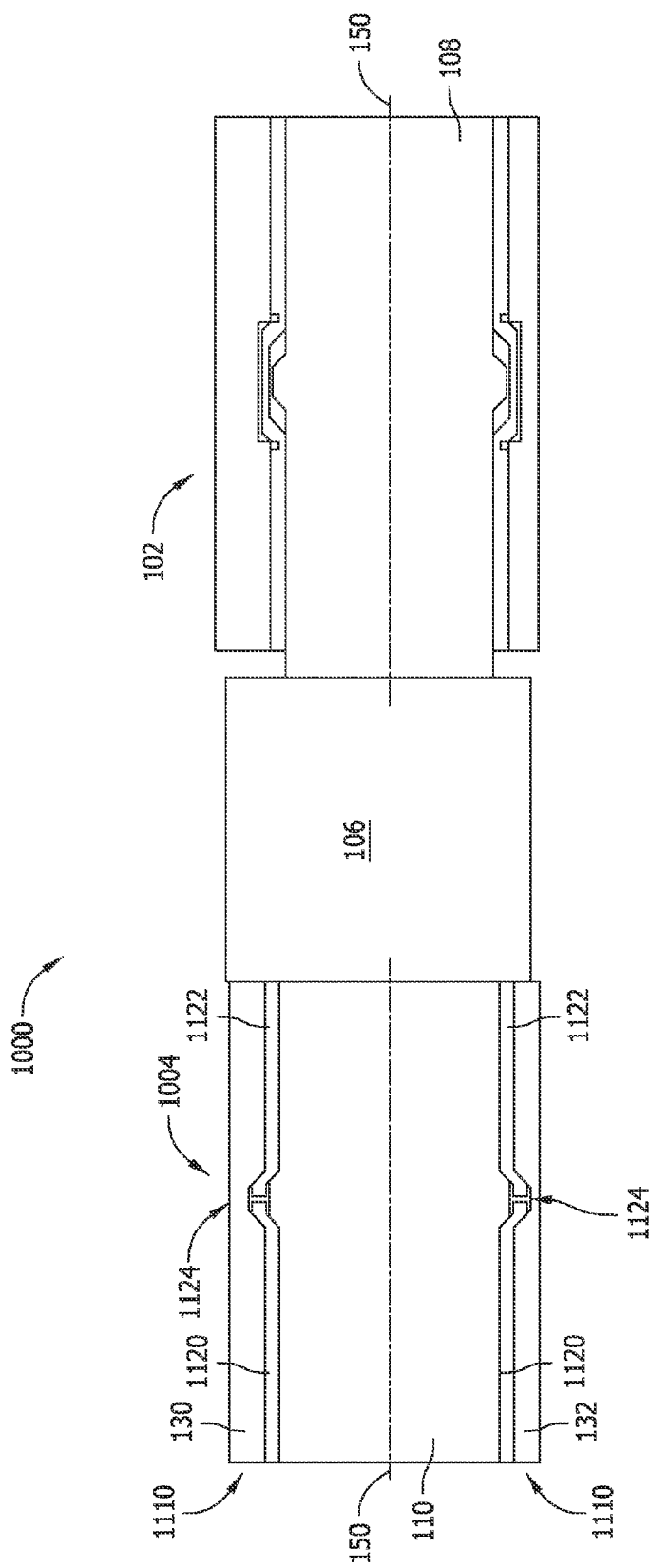
FIG. 10 is a schematic diagram of an alternative clamp assembly.

FIG. 10 is a schematic diagram of an alternative clamp assembly 1000. Unless otherwise noted, clamp assembly 1000 operates substantially similar to clamp assembly 100 (shown in FIG. 1), and like reference numerals are used to indicate like elements.

As shown in FIG. 10, alternative clamp includes a second pin assembly 1004 that retains second pin 110. Unlike second pin assembly 104 (shown in FIG. 1), second pin assembly 1004 includes a pair of split bushings 1110 that constrain second pin 110 between second swinging housing 130 and second stationary housing 132. Each split bushing 1110 is shaped substantially similar to first and second bushings 120 and 122, but includes two pieces instead of one. More specifically, each split bushing includes a first bushing piece 1120 and a second bushing piece 1122 separated by a gap 1124.

First and second bushing pieces 1120 and 1122 are coupled to second swinging housing 130 and second stationary housing 132 using any suitable coupling mechanism. For example, first and second bushing pieces 1120 and 1122 may couple to second swinging housing 130 and second stationary housing 132 using a snap-fit mechanism similar to that of first and second bushings 120 and 122.

If a continuous bushing, such as first bushing 120, is used in second pin assembly 104, due to manufacturing tolerances, the continuous bushing may interfere with second pin 110, second swinging housing 130, and/or second stationary housing 132. However, the configuration of split bushings 1110 allow first and second bushing pieces 1120 and 1122 to float in the axial and radial directions to account for manufacturing tolerances and other variations. Split bushings 1110 also facilitate protecting second swinging housing 130 and second stationary housing 132 from wear and/or damage. In some implementations, first pin assembly 102 includes split bushings 1110 instead of first and second bushings 120 and 122.

The implementations described herein enable installing and removing bushings from a clamp assembly relatively quickly and easily, and without the use of specialized tools. The bushings include a retention feature that allows for a snap-fit engagement between the bushings and a housing. The bushings also include a chamfer that facilitates removing the bushings using common tools, such as a flat-head screwdriver.

Unlike at least some known clamp assemblies, the systems and methods described herein enable installing and removing bushings without using specialized tools. Further, as compared to at least some known clamp assemblies, the bushings described herein engage a stationary housing or a swinging housing using a snap-fit feature, expediting and streamlining bushing installation.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bushing for use in a pin assembly that includes a swinging housing and a stationary housing, said bushing comprising:
    a first end portion;
    a second end portion; and
    a central portion extending between said first and second end portions and comprising a plurality of flexible fingers, each of said flexible fingers comprises a retention feature configured to engage one of the swinging housing and the stationary housing in a snap-fit configuration.

2. A bushing in accordance with claim 1, wherein said central portion is offset with respect to said first and second end portions.

3. A bushing in accordance with claim 2, wherein said central portion defines an inner channel that is oriented to receive a circumferential lip of a pin.

4. A bushing in accordance with claim 1, wherein each finger comprises a top surface, and wherein said retention feature comprises:
    a tapered side wall that is oriented obliquely relative to said top surface;
    a vertical side wall that is oriented orthogonally to said top surface; and
    a top wall extending between said tapered and vertical side walls.

5. A bushing in accordance with claim 1, wherein each of said flexible fingers further comprises a chamfer configured to facilitate removing said bushing from one of the swinging housing and the stationary housing.

6. A bushing in accordance with claim 5, wherein each of said flexible fingers further comprises:
    a top surface; and
    an end surface that is oriented orthogonal to said top surface, wherein said chamfer comprises a wall extending obliquely between said top and end surfaces.

7. A pin assembly comprising:
    a stationary housing defining a first recess;
    a swinging housing rotatably coupled to said stationary housing and defining a second recess;
    a first bushing positioned within said first recess and coupled to said stationary housing in a snap-fit engagement; and
    a second bushing positioned within said second recess and coupled to said swinging housing in a snap-fit engagement.

8. A pin assembly in accordance with claim 7, further comprising a pin positioned between said first and second bushings.

9. A pin assembly in accordance with claim 8, wherein each of said first and second bushings defines an inner channel configured to receive a circumferential lip of said pin.

10. A pin assembly in accordance with claim 7, wherein at least one of said first and second bushings is a split bushing that comprises:
    a first bushing piece; and
    a second bushing piece separated from said first bushing piece by a gap.

11. A pin assembly in accordance with claim 7, wherein at least one of said first and second bushings comprises:
    a first end portion;
    a second end portion; and
    a central portion extending between said first and second end portions and comprising a plurality of flexible fingers, each of said flexible fingers comprises a retention feature.

12. A pin assembly in accordance with claim 11, wherein at least one of said stationary housing and said swinging housing defines a retention hollow configured to receive said retention feature.

13. A pin assembly in accordance with claim 11, wherein said central portion is offset with respect to said first and second end portions.

14. A pin assembly in accordance with claim 11, wherein each of said flexible fingers comprises a top surface, and wherein said retention feature comprises:
- a tapered side wall that is oriented obliquely relative to said top surface;
- a vertical side wall that is oriented orthogonal to said top surface; and
- a top wall extending between said tapered and vertical side walls.

15. A pin assembly in accordance with claim 11, wherein each of said flexible fingers further comprises a chamfer configured to facilitate removing said at least one of said first and second bushings from said swinging housing or said stationary housing.

16. A pin assembly in accordance with claim 15, wherein each finger comprises:
- a top surface; and
- an end surface that is oriented orthogonal to said top surface, and wherein said chamfer comprises a wall extending obliquely between said top and end surfaces.

17. A method for assembling a pin clamp, said method comprising:
- rotatably coupling a stationary housing to a swinging housing, wherein the stationary housing defines a first recess and the swinging housing defines a second recess;
- coupling a first bushing to the stationary housing in a snap-fit engagement such that the first bushing is positioned within the first recess; and
- coupling a second bushing to the swinging housing in a snap-fit engagement such that the second bushing is positioned within the second recess.

18. A method in accordance with claim 17, further comprising clamping a pin in between the first and second bushings.

19. A method in accordance with claim 17, wherein coupling a first bushing to the stationary housing comprises engaging a retention hollow formed in the stationary housing with a retention feature formed on the first bushing.

20. A method in accordance with claim 17, further comprising detaching the first bushing from the stationary housing by applying pressure to a chamfer formed on the first bushing.

* * * * *